UNITED STATES PATENT OFFICE.

WILLIAM F. A. SCHRADER, OF BROOKLYN, NEW YORK, ASSIGNOR TO TRAUN RUBBER CO., OF COLLEGEPOINT, NEW YORK, A CORPORATION OF NEW JERSEY.

RUBBER-DAM SHEETING.

No. 802,711. Specification of Letters Patent. Patented Oct. 24, 1905.

Application filed April 7, 1905. Serial No. 254,371.

*To all whom it may concern:*

Be it known that I, WILLIAM F. A. SCHRADER, a citizen of the United States of America, and a resident of Brooklyn, in the county of Kings and State of New York, have invented certain new and useful Improvements in Rubber-Dam Sheeting, of which the following is a specification.

This invention has reference to a novel line of rubber goods; and it is the special object of my invention to produce rubber goods which are perfumed or scented, and thereby caused to be fragrant, having then an agreeable odor which is emitted during the use of said goods.

My novel scented rubber goods contain perfumes, which latter form a constant component of same and are distributed throughout the entire mass. The perfumes are employed in solid powdered form, and the goods retain the fragrance after same have been finished and placed on the market, so that an agreeable odor is emitted when the goods are applied.

My novel rubber goods consists in thin highly-elastic and scented rubber sheetings which are used wholly or partly for wearing-apparel, and particularly in dentistry. The scented rubber sheeting is very well adapted for rubber dams employed by dentists and for dress-shields such as are used in ladies' dresses. Such rubber sheeting is very elastic and tough and solid perfumes only can be used in its manufacture, because the sheeting consists of pure rubber. For making highly-elastic goods resins or gums which may occur in the raw rubber have to be washed out, so that solely pure rubber remains. Oils and moist substances are occasionally employed in hard-rubber compounds which are used for insulation and other purposes. Such hard-rubber compounds also contain oxid of zinc, whiting, &c., and the presence of oils in solid molded goods of that description does not do any harm. Likewise gum-benzoin has been used as a component in gum compounds used in the manufacture of vulcanized cloth. This gum-benzoin contains resinous substances, benzoic acid, and essential oil, which latter impairs the good qualities of thin elastic-rubber sheeting, making same porous and spongy. Gum-benzoin, further, is not a well-defined chemical substance of uniform constitution. It is a mixture of numerous substances and varies in quality and composition. Therefore it cannot be used for manufacturing thin and highly-elastic rubber-dam sheeting, because no uniform product can be produced thereby, and owing to the fact that it contains oils it makes such goods porous and spongy. When it is attempted to use oils either singly or in mixtures in the manufacture of elastic-rubber sheeting which consists of pure rubber, then it is found that porosity is caused by their application, and the elasticity and toughness of the goods are impaired to such a degree that same cannot be used.

As is well known, a disagreeable odor is emitted from rubber goods placed heretofore on the market. This is particularly the case with the rubber sheeting employed for making the so-called "rubber dams," which are forced around a tooth so as to keep the saliva from the cavity under treatment. The obnoxious odor which issues from the former kind of rubber dams while in the mouth of the patient makes the treatment of teeth very unpleasant. These dams when made of my scented rubber sheeting emit a mild and agreeable odor of perfume during the treatment of the tooth. Likewise a disagreeable odor issues from dress-shields when the impervious rubber sheets forming part of the same become warm by the heat of the human body. However, when the dress-shields are provided with impervious layers made of my scented rubber sheeting then an odor of perfume is perceptible.

The perfumes which are a component in my novel goods do not impair the usual good qualities of the rubber. Any perfume obtainable in powdered form may be used. Such substances are, for instance, heliotropin, cumarin, and nerolin. These substances are crystalline and may be easily reduced to powder. The percentage of perfume introduced into the rubber mass depends on the strength of the particular substance employed. However, a small percentage answers all practical purposes. The powdered perfume is compounded or incorporated with the ground mass of pure rubber, which then is calendered until it has the desired thickness. The rubber sheeting thus produced is now vulcanized, after which treatment the goods are finished and ready for sale and use.

The agreeable odor of perfume is not expelled during the process of manufacturing the sheeting and same remains fragrant. This quality makes the sheeting adapted for use in any instance where an agreeable odor is desirable.

In the described manner I have provided scented rubber sheeting particularly adapted for use as rubber dams and which may be employed in any instance where the use of the former unscented sheeting was unpleasant or undesirable.

Having thus described my invention, I claim as new and desire to secure by Letters Patent—

1. As a new article of manufacture thin, highly-elastic and scented rubber goods composed of pure rubber, solid perfumes in powdered form and sulfur from the process of vulcanization.

2. As a new article of manufacture thin, highly-elastic and scented rubber-dam sheeting composed of pure rubber, solid perfumes in powdered form and sulfur from the process of vulcanization.

3. As a new article of manufacture thin, highly-elastic and scented rubber-dam sheeting composed of pure rubber, crystallized perfumes in powdered form and sulfur from the process of vulcanization.

4. As a new article of manufacture a composition for the manufacture of scented rubber goods consisting of pure rubber, solid perfumes of uniform chemical constitution finely distributed throughout the entire mass and sulfur from the process of vulcanization and adapted to be rolled out into thin sheetings.

Signed at New York, N. Y., this 6th day of April, 1905.

WILLIAM F. A. SCHRADER.

Witnesses:
JAMES J. ASTARITA,
AGNES SIMMONS.